A. F. FRENCH.
Car Starter.

No. 49,195. Patented Aug. 1, 1865.

Witnesses:

Inventor:

UNITED STATES PATENT OFFICE.

A. F. FRENCH, OF FRANKLIN, VERMONT, ASSIGNOR TO HIMSELF AND ED. CHAS. TERRILL.

IMPROVED MODE OF STARTING CARS.

Specification forming part of Letters Patent No. 49,195, dated August 1, 1865.

*To all whom it may concern:*

Be it known that I, A. F. FRENCH, of Franklin, in the county of Franklin and State of Vermont, have invented a new and Improved Lever-Power for Starting Street-Cars, &c.; and I do hereby declare that the following is a full, clear, and exact description thereof, which will enable others skilled in the art to make and use the same, reference being had to the accompanying drawings, forming part of this specification, in which—

Figure 1:
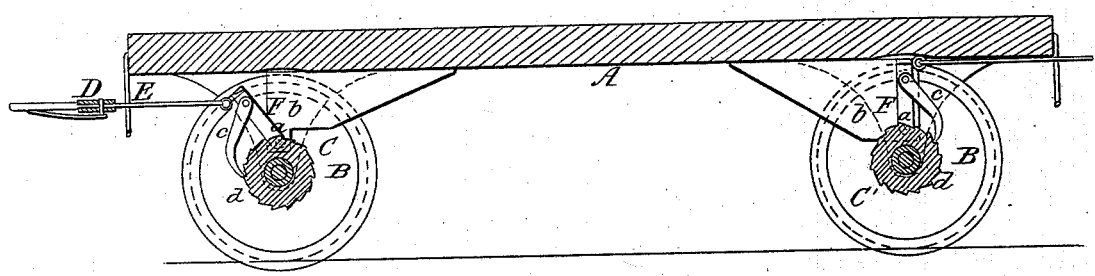
Figure 2:
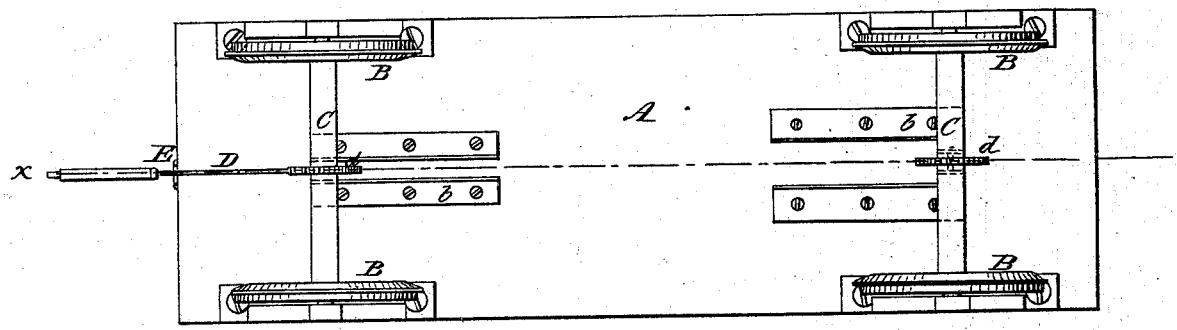
Figure 3:
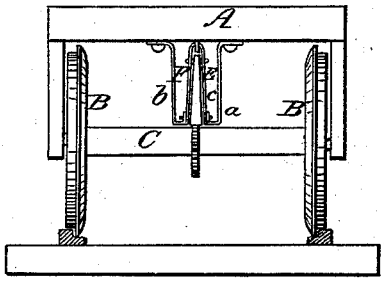

Figure 1 represents a longitudinal vertical section of this invention, the line $x\,x$, Fig. 2, indicating the plane of section. Fig. 2 is an inverted plan of the same. Fig. 3 is an end view of the same.

Similar letters of reference indicate like parts.

This invention consists in the application of a lever, pawl, and ratchet, in combination with the draft-rod or draft-chain and with the axle of a street-car or other vehicle, in such a manner that in starting the car the strain exerted by the draft animal or animals is increased by the purchase of the lever, and the operation of starting the car or other vehicle is rendered comparatively easy, and can be effected with much less exertion for the draft animal or animals than by the ordinary arrangement.

A represents the platform of an ordinary street-car, which is supported by the axles C of the wheels B in the ordinary manner.

D is the draft-pole or draft-chain, which passes through a guide-bracket, E, secured to the end of the car. The inner end of this draft-pole is attached to a lever, F, which has its fulcrum on a pivot, $a$, secured in a bracket, $b$, that is suspended from the under surface of the platform A. This lever carries a pawl, $c$, which engages with the teeth of a ratchet-wheel, $d$, mounted on the axle C; or, instead of mounting this ratchet-wheel on the axle, it may be cast solid with one of the wheels; or both wheels may be provided with such ratchets, if desired. In the drawing one ratchet is shown, which is secured to the axle at about the middle of its length.

The pawl C is connected to the lever F by means of a pivot, $e$, and it engages with the ratchet-teeth by reason of its inherent gravity; or, if desired, a spring may be applied which will hold the same in gear with said teeth.

In starting the car the strain is exerted on the end of the F, and it is multiplied by the purchase of said lever, so that the operation of starting can be accomplished with comparatively little exertion for the draft-animals. In stopping the lever F is carried back to its original position either by the action of the draft-pole, or, if a chain is used, by means of a spring which may be applied to it. It is obvious that this lever and ratchet may be applied to vehicles of any other description beside street-cars; but in case the wheels are made to turn on the axle the ratchet-wheels must be rigidly connected to said wheels.

I claim as new and desire to secure by Letters Patent—

The lever F, pawl $c$, in combination with the ratchet-wheel $d$, draft-pole D, and with the axle or wheel of a street-car or other vehicle, constructed and operating substantially as and for the purpose set forth.

The above specification of my invention signed by me this 13th day of June, 1865.

A. F. FRENCH.

Witnesses:
M. M. LIVINGSTON,
WM. F. MCNAMARA.